Dec. 8, 1931.     G. H. HUFFERD     1,835,160
BALL JOINT
Filed Feb. 12, 1930
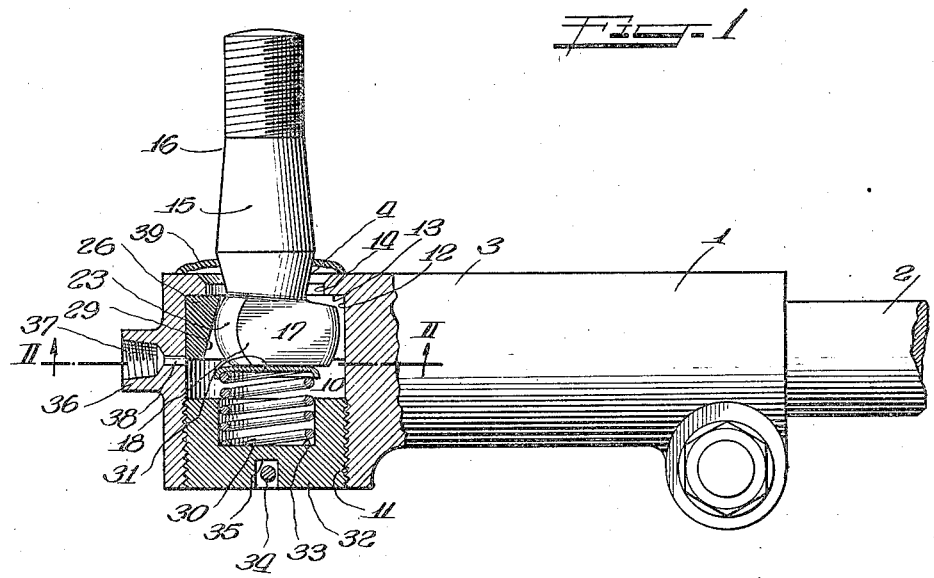
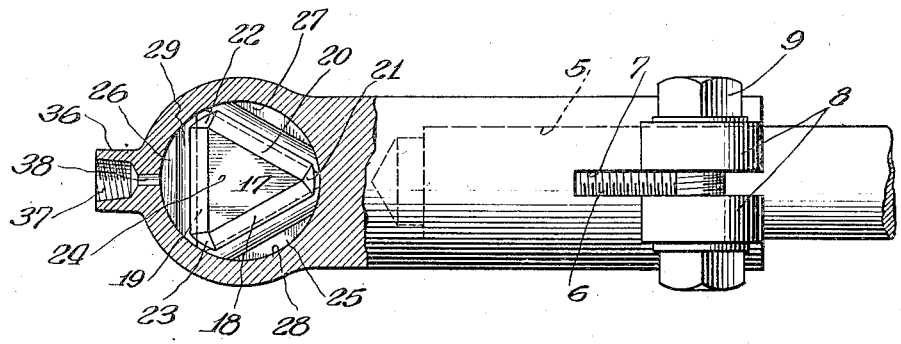
Inventor:
George H. Hufferd.
by: Charles W. Hills
Attys.

Patented Dec. 8, 1931

1,835,160

UNITED STATES PATENT OFFICE

GEORGE H. HUFFERD, OF DETROIT, MICHIGAN, ASSIGNOR TO THOMPSON PRODUCTS, INCORPORATED, OF CLEVELAND, OHIO, A CORPORATION OF OHIO

BALL JOINT

Application filed February 12, 1930. Serial No. 427,711.

This invention relates to a ball joint particularly adapted for use in the steering mechanism of automotive vehicles and the like.

In the usual type of ball joint, contacting spherical surfaces are generally employed for the obtention of the desired relative movement between the parts of the joint. It is, however, relatively difficult in commercial manufacture to obtain truly spherical surfaces and, as a result of this difficulty, the cooperating spherical surfaces are rarely truly spherical, with the result that contact between such surfaces is likely to be in the nature of a point contact rather than a surface contact. Failure to secure true surface contact leads to excessive wear between the contacting surfaces and also to faulty lubrication, owing to the greater pressure developed where the contacting surfaces are of relatively limited area.

It is therefore an important object of this invention to provide a ball joint of such construction that line contact is insured between cooperating parts of the joint.

It is a further important object of this invention to provide a ball joint that is relatively cheap to manufacture and satisfactory in its operation.

Other and further important objects of this invention will be apparent from the disclosures in the specification and the accompanying drawings.

This invention (in a preferred form) is illustrated in the drawings and hereinafter more fully described.

On the drawings:

Figure 1 is an elevational view of a tie rod end showing a ball joint of my invention in section.

Figure 2 is a sectional view taken substantially on line II—II of Figure 1, with parts in elevation.

As shown on the drawings:

The reference numeral 1 indicates as a whole a tie rod end connection, including a tie rod 2, a combination housing and clamping member 3 for receiving the end of said tie rod 2 and a ball joint assembly, indicated as a whole by the reference numeral 4 associated with said housing 3. In accordance with the usual practice, the housing 3 is provided with a threaded bore 5 for receiving the threaded end 6 of said tie rod 2 and is slotted for a portion of its length as at 7 and provided with spaced lugs 8 and a bolt 9 passing therethrough for more securely clamping said housing 3 upon the end of a tie rod 2.

Said housing 3 is provided at its end with a transversely extending bore 10, threaded for a portion of its length as at 11 and provided with a smooth cylindrical wall 12 extending as far as an internal shoulder 13, beyond which the bore is reduced as at 14 to provide an opening through the housing wall for the shank 15 of a ball stud 16. A ball 17 is provided on the end of the ball stud 16 within the bore 10. Said ball 17 instead of being spherical as is the usual ball of a ball joint, is of triangular cross-section and is provided with cylindrical surfaces 18, 19 and 20 of substantially equal area and joins the one to the other through rounded corner surfaces 21, 22 and 23. The axes of curvature of the cylindrical surfaces 18, 19 and 20 all lie in a plane normal to the axis of the ball stud 16. The bottom of the ball 17 is a flat plane surface 24.

Bearing seats 25, 26 and 27 are positioned in the smooth portion of the bore 10 for cooperation with the respective ball faces 18, 19 and 20. Each of said bearing seats is provided with an outer cylindrical face, as at 28 for contact with the cylindrical wall 12 of the bore 10 and for relative rotation with respect to the housing 3. Each of said seat members is further provided with a plane inner face, as at 29 (Figure 1) for contact with one of the cylindrical faces of the ball 17, said inner face 29 being inclined upwardly toward the axis of the ball stud 16 when the device is in the position shown on the drawings to provide, in cooperation with other elements about to be described, a wedging action between the ball 17 and said seat members 25, 26 and 27.

This wedging action is obtained by means of a helical spring 30 mounted between a dished plate 31 that bears against the bottom face 24 of the ball 17 and a threaded plug 32 adapted to be screwed into the threaded portion 11 of the bore 10. The plug 32 may be suitably provided with a cylindrical recessed portion 33 for receiving the lower portion of the spring 30. When the plug 32 is screwed into place and held against unscrewing by means of a cotter pin 34 passing through a slot 35 in the end of said plug and corresponding apertures (not shown) in the wall of said housing, the spring 30 is placed under sufficient compression to hold the ball 17 in wedging contact with the seat members 25, 26 and 27. In this way, wear between the contacting surfaces and any play that might otherwise develop is automatically compensated for.

It will be understood that angular displacement of the ball stud 16 with respect to its own axis when in normal position is permitted by relative sliding of the cylindrical faces 18, 19 and 20 of the ball 17 over the plane inner faces of the corresponding seat members, 25, 26 and 27. Said cylindrical faces of the ball 17 and cooperating plane surfaces of the seat members are at all times in line contact in theory so that there can be no binding between the engaging surfaces. Relative rotation between the ball stud 16 and the housing 3 is made possible by the provision of contacting cylindrical surfaces between the ball seat members and the housing 3, as afforded by the cylindrical outer walls of said seat members and the inner cylindrical wall 12 of said housing. During such relative rotation, there is no relative movement between the ball 17 and the various seat members 25, 26 and 27, movement being entirely between the contacting cylindrical surfaces aforementioned.

In order to provide for lubrication between the contacting surfaces, the housing 3 is preferably formed with a boss 36 having a threaded tapered bore 37 for receiving a suitable lubricating fitting and a communicating aperture 38 extending into the interior of said bore 10. A standard type of dust cover and oil seal 39 may be secured to the housing 3 surrounding the shank of the ball stud 16 for closing the reduced opening 14 of the bore 10.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In combination, a headed member having a head of triangular cross-section and having cylindrical faces the axes of which lie in a plane normal to the axis of said member, a housing having an inner cylindrical wall and wedge-shaped members having cylindrical outer faces for contact with said cylindrical wall and inner tapered plane faces for contact with the cylindrical faces of said head whereby said head member is free to move universally with respect to said housing.

2. In combination, a headed member having a head of triangular cross-section and having cylindrical faces the axes of which lie in a plane normal to the axis of said member, a housing having an inner cylindrical wall, wedge-shaped members having cylindrical outer faces for contact with said cylindrical wall and inner tapered plane faces for contact with the cylindrical faces of said head whereby said head member is free to move universally with respect to said housing and resilient means urging said head into contact with said tapered plane faces.

3. In a ball joint, a housing having a cylindrical inner wall, a ball of a ball stud within said housing, said ball having three cylindrical faces joined by rounded surfaces, the axes of said cylindrical surfaces being normal to the axis of said stud and spaced seat members having cylindrical outer faces contacting said cylindrical housing wall and having inner tapered plane faces in line contact with the cylindrical faces of said ball.

4. In a ball joint, a housing, a ball of a ball stud of triangular cross-section within said housing, seat members engaging said ball and relatively rotatable with respect to said housing, said ball and seat members having cylindrical and plane faces in line contact with each other, the plane faces being tapered to provide wedging action between said contacting faces.

5. In a ball joint, a housing, a ball of a ball stud of triangular cross-section within said housing, the faces of said ball being curved about axes normal to the axis of said stud and seat members rotatable in said housing and having tapered plane faces contacting said ball faces.

6. In a ball joint, a housing having a cylindrical bore therein, said bore being reduced at one end to provide a shoulder therein, a stud member extending through the reduced portion of said bore and having a head of triangular cross section, said head having cylindrical faces the axes of which lie in a plane normal to the axes of said stud, wedge-shaped members having cylindrical outer faces and plane inner faces, said wedge-shaped members being rotatable in said housing, said stud being rotatable with respect to said wedge-shaped member, a pulley for said cylindrical bore having a recess therein, and a spring in said recess adapted to urge said head into contact with the wedge-shaped members.

In testimony whereof I have hereunto subscribed my name at Detroit, Wayne County, Michigan.

GEORGE H. HUFFERD.